Jan. 25, 1966   R. W. HYDE   3,231,770
SELF-STARTING SYNCHRONOUS MOTOR
Filed Nov. 19, 1962   3 Sheets-Sheet 2
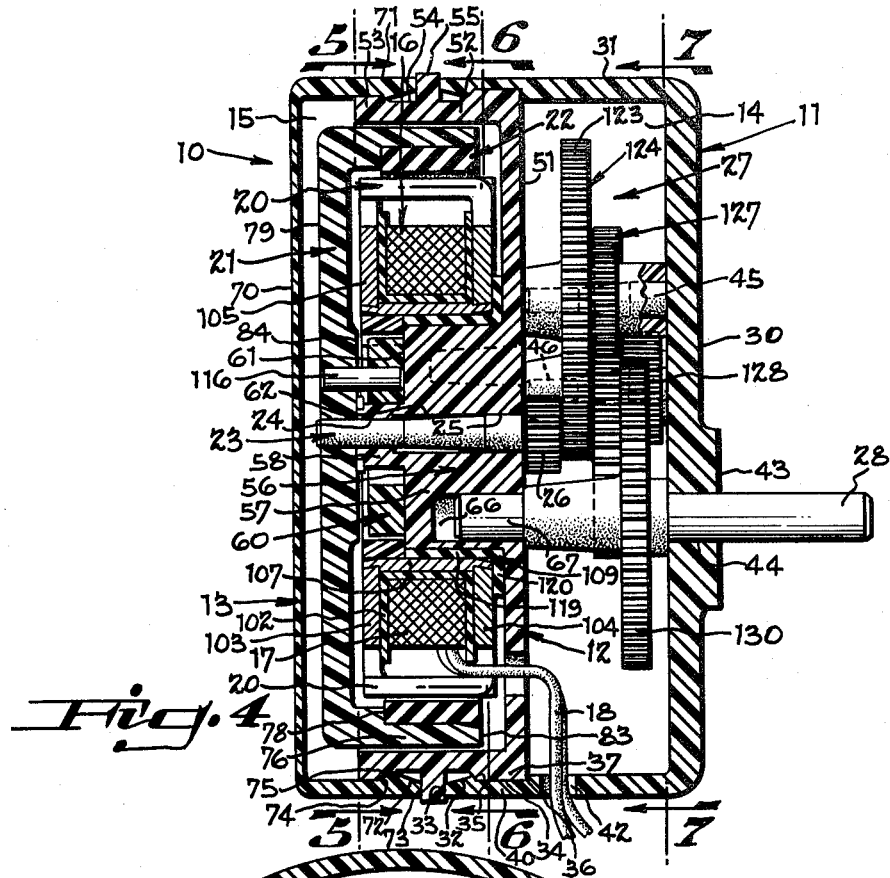
INVENTOR.
Robert W. Hyde.
BY Wood, Herron & Evans.
ATTORNEYS.

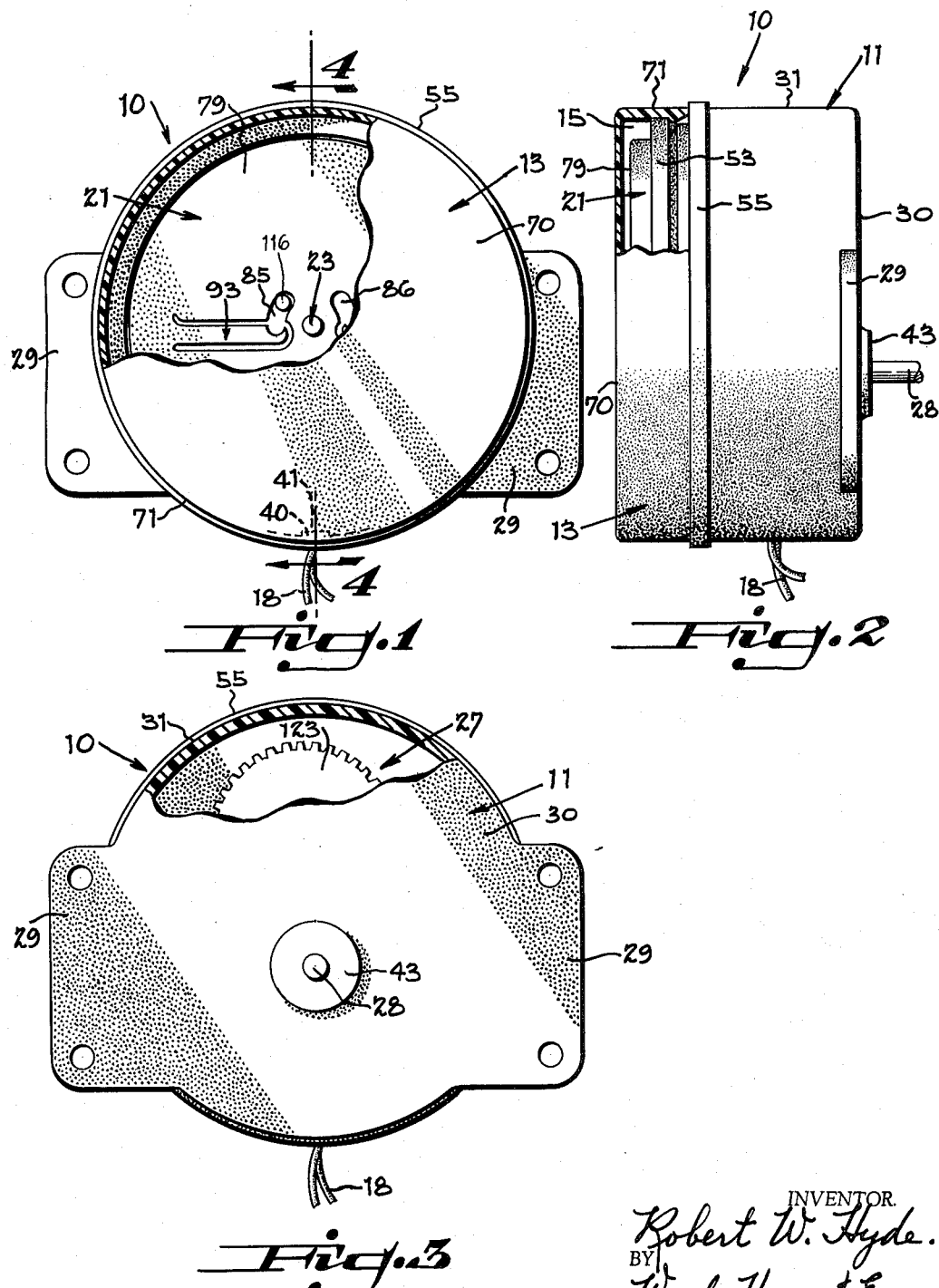

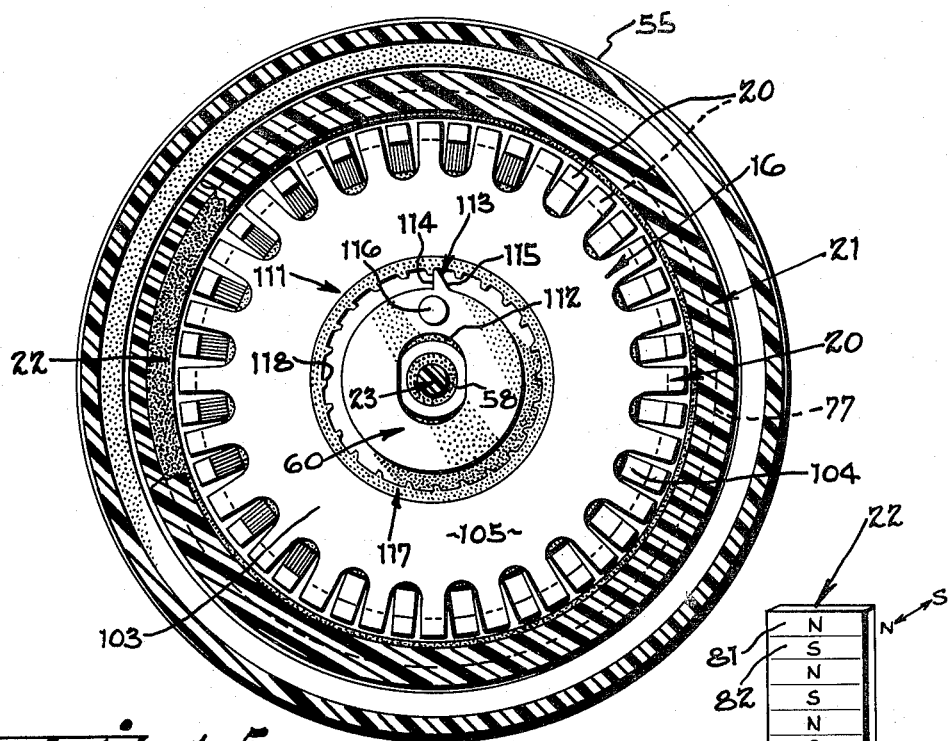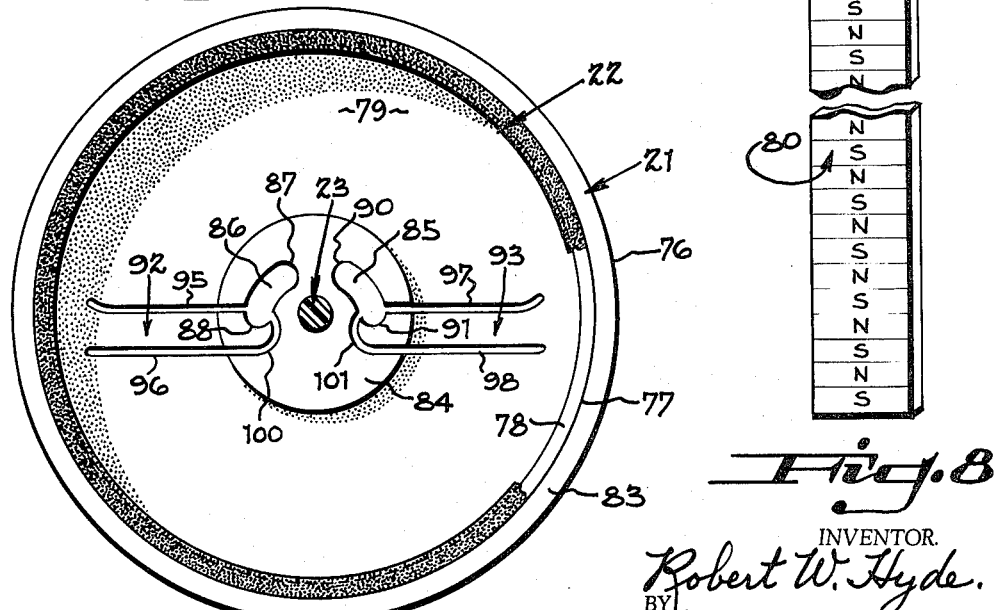

United States Patent Office 3,231,770
Patented Jan. 25, 1966

3,231,770
SELF-STARTING SYNCHRONOUS MOTOR
Robert W. Hyde, Cincinnati, Ohio, assignor to KDI Corporation, Cincinnati, Ohio, a corporation of Delaware
Filed Nov. 19, 1962, Ser. No. 238,603
5 Claims. (Cl. 310—156)

This invention relates to small alternating current electric motors and is particularly directed to a novel self starting synchronous motor of the type commonly used for clocks, timing devices, control apparatus and the like.

One of the principal objects of the present invention is to provide a small synchronous motor effective to provide substantially higher output torque for a given motor size and electrical power input than any of the synchronous motors which have heretofore been proposed.

Another object of the present invention is to provide a synchronous motor which is self starting with the utmost reliability and which includes direction control means for insuring that the rotor is always driven in a selected direction.

Another object of the present invention is to provide a motor which is extremely quiet in operation. This quietness is due in part to the unique construction of the reversing mechanism which is free running, or disengaged, when the rotor is rotating in the desired direction and to a novel resilient stator mount which prevents stator oscillations from setting up hum in the member upon which the motor housing is mounted.

Another important object of the present invention is to provide a motor which is economical to produce and which at the same time is very rugged and long lived.

More particularly, the present invention is predicated in part upon the concept of providing a small electric timing motor having a rotor which carries an annular strip magnet surrounding the stator pole pieces. In accordance with the present invention, the rotor magnet material consists of a strip of rubber or plastic in which is dispersed aligned ultrafine, highly retentive anisotropic particles of permanent magnet material such as barium ferrite. This magnetic strip is magnetized transversely of its thickness to provide a plurality of adjacent magnetic poles. The adjacent poles on one surface of the sheet are of opposite polarity, i.e. from one end of the strip to the other the poles are arranged north, south, north, south, etc. The poles in the rotor magnet are equal in number to the stator poles. In the preferred embodiment, this magnetic strip is bent into circular shape and is inserted within a peripheral flange of a cup-shaped rotor. The rotor itself which supports the magnet is preferably formed of a very lightweight plastic so that the entire rotor structure weighs only a minimum amount, for example, a small fraction of an ounce.

One advantage of the present motor construction is that it facilitates the provision of a rotor and stator having a large number of poles, for example fifty. Consequently, the rotor speed is quite low, e.g. one hundred and forty-four revolutions per minute for a fifty pole motor. This slow rotor speed in combination with the lightweight rotor construction eliminates all problems in retaining rotor balances.

Another advantage of the present motor construction is that it facilitates the provision of a motor having a large rotor torque for a small electrical power input. For example, one motor constructed in accordance with the present invention is effective to produce forty-four inch-ounces of torque with a power input of only one watt. Thus, the present motor not only has a high torque output, but also has a high operating efficiency. This efficiency in terms of the ratio of mechanical power out to electrical power in is of the order of sixteen to thirty-two times as great as that of presently available timing motors.

Another advantage of the present motor which results from its high efficiency is that the motor has a minimum heat rise. It has long been recognized that the heat generated by timing motors during their operation eventually has a deleterious effect on the lubricants used in the motor and associated mechanisms. This, of course, either requires excessive maintenance or results in a material shortening of the equipment life. In contrast, the present motor runs for protracted periods with an almost imperceptible heat rise which cannot harm any lubricants used in the motor or other mechanisms.

Another advantage of the present motor is that the motor is effective to provide sizable torque with only a minimum current drain, so that the motor can be energized from transistor or crystal diode circuits. For example, a small motor embodying the present invention having one-eighth of a watt input is effective to produce an output torque of the order of ten to twelve inch-ounces. Previously available timing motors require approximately thirty times this input power to produce the same amount of torque. As a result it is not feasible to run these motors from a transistor or crystal diode input circuit.

Another advantage of the present motor construction is that it is self starting under all conditions. Yet, the present motor does not require any shaded poles, split windings or other special self starting means. Rather, as is explained in detail below, the present motor is effective to self start because of two aspects of its construction. The first aspect of the construction is that the normal manufacturing tolerances involved in the construction of the stator results in the stator having asymmetric poles, i.e. there are minute variations in the spacing between the stator poles so that the poles are not absolutely equispaced about the stator periphery. Additionally, the stator is resiliently mounted so that it is free to vibrate or oscillate through a minute amplitude. As a result, the stator is effective to produce an unbalanced magnetic effect on the rotor. Because the rotor is extremely lightweight, this initial unbalance of the magnetic forces on the rotor is effective to start the rotor moving no matter in what position the rotor has been brought to rest.

The present motor is further provided with novel means for controlling direction of rotation of the rotor. In accordance with the present invention this direction control means comprises a pawl mounted on a bearing shaft concentric with the rotor shaft. The pawl has a peripheral finger and an elongated slot. Thus, the pawl is adapted for both rotating movement concentric with the rotor shaft and translational movement relative to the shaft. The pawl cooperates with an annular ratchet member within which the pawl rotates. When the pawl is positioned so that one end of its slot engages the support bearing, the pawl rotates with the rotor in a retracted position with its finger out of engagement with the ratchet teeth. However, when the pawl is cammed outwardly so that the opposite end of the pawl slot engages its bearing, the pawl finger engages the ratchet teeth to prevent further rotation of the pawl.

The pawl position is controlled by a projection which extends outwardly from the pawl and is received within a spiral-like arcuate slot formed in the rotor. This slot is effective, when the rotor is operating in its correct or selected direction, to retract the pawl. However, when the rotor starts in the opposite or "wrong" direction, the slot cams the pawl outwardly into engagement with the ratchet teeth. The pawl is thus locked against further movement and in turn stops movement of the rotor. As the instantaneous polarity of the stator poles changes, the rotor starts to rotate in the opposite or "selected" direction.

A preferred form of rotor further includes a cantilever spring arm constituting one end of the rotor slot. This spring arm is formed integral with the rotor which is molded from a plastic, such as Delrin, having spring characteristics. The spring arm performs a double function in that it absorbs some of the shock of rotor reversal and also provides a spring impetus to start the rotor moving in the correct direction.

One advantage of the present reverse mechanism is that when the rotor is rotating in the correct direction, the pawl is completely disengaged from the ratchet so that there is no clicking or other objectionable noise. Also, the reversing mechanism imposes no appreciable friction load on the motor when it is rotating in the selected direction.

In the preferred embodiment of the present reversing mechanism two opposed slots are provided in the rotor. As a result, the direction of motor rotation can be changed, as is explained in detail below, by merely reversing the pawl and ratchet members and inserting the pawl projection in the opposite rotor slot.

These and other objects and advantages of the present invention will be more readily apparent from a consideration of the following detailed description of the drawings illustrating a preferred embodiment of the invention.

In the drawings:

FIGURE 1 is a plan view of a motor constructed in accordance with the present invention, with a portion of the housing cover being broken away to show portions of the rotor and reversing mechanism.

FIGURE 2 is an end view of the motor with a portion of the cover being broken away.

FIGURE 3 is a bottom view of the motor with portions of the housing broken away to show portions of the gear train.

FIGURE 4 is a cross sectional view taken along line 4—4 of the FIGURE 1.

FIGURE 5 is a cross sectional view taken along line 5—5 of FIGURE 4.

FIGURE 6 is a view of the rotor only as viewed along line 6—6 of FIGURE 4.

FIGURE 7 is a cross sectional view taken along line 7—7 of FIGURE 4.

FIGURE 8 is a plan view of a preferred form of magnetic strip utilized in fabricating the present motor.

The general construction of synchronous motor 10 embodying the principles of the present invention is shown in FIGURES 1–4. As there shown motor 10 comprises a generally cup-shaped gear housing member 11, a transverse motor mounting member 12 which extends across the gear housing 11, and a cover member 13 which fits over the motor support member. The space between the motor support member 12 and the gear housing 11 constitutes a gear chamber 14, while the space between transverse member 12 and cover 13 comprises a motor chamber 15. As is explained in detail below, gear housing 11, motor support member 12 and cover member 13 are preferably formed of a suitable moldable plastic, such as nylon or Delrin.

Mounted within motor chamber 15 is a stator structure 16 comprising an annular coil 17 energized through leads 18 and a plurality of stator pole extensions 20. Motor chamber 15 also houses a rotor member 21. Rotor member 21 is preferably formed of a suitable plastic such as Celcon or Delrin and is of generally cup-shaped configuration. The rotor supports an annular rotor magnet member 22, which surrounds the field pieces 20.

As is explained in detail below magnet member 22 includes a plurality of aligned minute permanent magnetic particles held in a rubber or plastic binder. This member is magnetized to form a plurality of poles equal in number to the number of pole extensions 20. Rotor 21 is mounted upon a center shaft 23. This shaft is rotatably journalled in suitable bearing sleeve portions 24 and 25 formed in motor support member 12. Center shaft 23 carries a pinion 26 which forms the drive pinion for a gear reduction train 27. The output of gear reduction train 27 is taken from output shaft 28. The inner end of this shaft is journalled in a bearing opening provided in member 12. The opposite end of shaft 28 extends outwardly through and is journalled in an opening formed in gear housing member 11.

More particularly, gear housing member 11 is a generally cup-shaped member. The housing includes a base wall 30 having two outwardly extending mounting flanges 29—29 provided with suitable mounting holes formed therein. The side wall 31 of gear housing 11 is of circular cross section and include an inwardly sloping cam face 32 adjacent the end 33 of the walls. An annular recess 34 is formed on the inner face of side wall 31 of the member 11 adjacent to inwardly extending cam face 32. This recessed portion forms two opposed shoulders, blocking shoulder 35 and abutment shoulder 36 adapted to clamp an annular flange portion 37 formed on motor support member 12.

As is best shown in FIGURES 1 and 4 housing 11 is provided with an inwardly extending projection or key member 40. This key member is received in a cooperating slot 41 formed in motor housing 12. The mating engagement of key 40 with slot 41 provides positive alignment of gear housing 11 and motor support 12 when the support member is snapped together with the housing member.

In addition to the elements described above, housing 11 includes a transverse opening 42 for lead-in wires 18. The housing is also provided with a boss like portion 43 having a cylindrical bore 44 formed therein for journalling output shaft 28. Base wall 30 of housing 11 carries two inwardly extending shafts 45 and 46 molded integral with housing member 11. Each of the shafts 45 and 46 is identical and includes an enlarged cylindrical portion adjacent to base wall 30, and a cylindrical portion of smaller diameter disposed adjacent to the free end of the shaft. These two cylindrical portions are joined by a tapered portion.

Motor support member 12 is also molded from a suitable plastic material such as Delrin or nylon. This support member is of generally cup-shape and is adapted to be partially nested within the end of gear housing 11. Motor support member 12 includes a transverse wall 51 effective to divide gear chamber 14 from motor chamber 15. Support member 12 further comprises a side wall 52 of circular configuration. The end of this wall adjacent to transverse wall 51 includes outwardly extending radial flange 37. The opposite end of side wall 52 includes an outwardly extending annular flange 53. Intermediate these flanges, side wall 52 includes a recessed portion 54 and a peripheral center flange 55.

Member 12 is assembled with houisng member 11 by snapping the flange 37 of member 12 into recessed portion 34 of the side wall of the gear housing 11, with slot 41 of the motor support member 12 being aligned to receive key member 40 of housing 11. When the member 12 is fully seated radial flange 55 engages the end 33 of side wall 31 of housing member 11.

Transverse wall 51 of motor support member 12 is provided with a cylindrical boss-like projection 56 extending into the motor chamber 15. Center boss 56 includes a cylindrical portion of enlarged diameter 57 disposed adjacent to transverse wall 51 and an outwardly extending concentric stub shaft portion 58. Cylindrical stub shaft portion 58 is adapted to receive and loosely support direction control pawl 60. This pawl fits over shaft portion 58 and abuts an annular shoulder 61 formed on cylindrical portion 57 of boss 56. Central boss 56 is provided with a bore 62. This bore is of a smaller diameter adjacent to shaft portion 58. It is of a larger diameter within cylindrical portion 57. The bore thus provides two spaced bearing portions 24 and 25 for center shaft 23.

This shaft has a small cylindrical section passing through the bearing 24 in shaft portion 58 and a section of larger diameter adjacent to transverse wall 51 of member 12. These two cylindrical sections of the shaft are joined by a tapered section. The motor support member 12 is further provided with a cylindrical bearing opening 66 extending inwardly through wall 51 into central boss 56. This rotatably journals one end 67 of output shaft 28. Transverse wall 51 further carries a shaft 68 (FIG. 7) which extends into gear chamber 14 and journals gear member 69.

Cover 13 is also generally cup-shaped and comprises a circular end wall 70 and a side wall 71. The inner surface of side wall 71 is provided with an inwardly sloping cam face 72 disposed at the outer end of the wall. The outer edge of this face meets edge 73 of the side wall which abuts radial flange 55 of motor support member 12. The inner edge of cam face 72 terminates in an inwardly extending shoulder 74 which abuts and is locked in place by a cooperating outwardly extending shoulder 75 formed on the side wall of member 12.

The details of construction of rotor 21 are best shown in FIGURES 1, 4 and 6. More particularly, rotor 21 is a dish-shaped member having a circular wall 79 and a peripheral wall 76. This rotor is preferably made of a suitable plastic such as Delrin, Celcon or the like. The rotor is press fit over the end of center shaft 23 which passes through an opening in the center of the rotor. The peripheral wall 76 of the rotor is configurated to form on its inner surface an annular recess 77 terminating in a shoulder 78. This recess seats the rotor magnet 22.

Magnet 22 is a rectangular strip of permanent magnetic material of the type comprising ultra fine particles of a permanent magnetic material such as Barium Ferrite, dispersed in alignment in a hard rubber binder. One highly satisfactory material of this type is produced by the Magnetics Division of Leyman Corp. under the trademark "Plastiform." This material and the method of its manufacture are more fully disclosed in United States Patent No. 2,999,275 issued to Walter Blume and entitled "Mechanical Orientation of Magnetically Anisotropic Particles."

As shown in FIGURE 8 the magnetic sheet 22 is magnetized transveresly of its thickness so that the sheet, in the specific embodiment shown, comprises fifty contiguous magnets. The adjacent magnets are of reverse magnetic orientation. Specifically as viewed in FIGURE 8 the top magnetic area 81 has a north pole on the front face 80 of sheet 22 and a south pole on the rear face of the sheet. The next adjacent magnetic area 82 has a south pole on the front face of the sheet and a north pole on the rear face of the sheet. The relative polarity of the remaining magnetic portions are indicated on FIGURE 8.

In fabricating the rotor, the magnetic strip is severed transversely at the juncture of two oppositely magnetized areas. Consequently, all of the magnetic poles are uniform. The strip is then bent into circular form and is inserted within recess 77 in the rotor. Since the circumferential dimension of the magnet member 22 when bent in circular form corresponds almost exactly to the inner dimension of the recess 77, magnet member 22 is held in place frictionally. However, a suitable adhesive can be applied between the rotor wall and magnet member 22 if desired. It is to be noted in FIGURE 4 that the magnet strip extends from shoulder 78 to the edge 83 of the rotor. Also, the thickness of the magnet strip is preferably slightly greater than the depth of the recess 77 so that the magnetic strip extends radially inwardly beyond the peripheral wall 76 of the rotor.

Transverse wall 79 of the rotor is configurated to form a thickened circular bearing portion 84 concentric with the center of the rotor. This thickened area faces inwardly and abuts the end of stub shaft portion 58 of motor support member 12.

Wall 79 of the rotor is also provided with two slots 85 and 86. These slots are disposed on opposite sides of the center of the rotor. The slots spiral outwardly in opposite directions i.e. slot 86 has one end 87 disposed at a minimum distance from the center of the rotor. The slot extends arcuately towards the opposite end 88 of the slot which is disposed at a greater distance from the center. Similarly, slot 85 extends from an end 90 disposed a short radial distance from the center of the rotor to an end 91 disposed at a greater distance from the center of the rotor. It will be appreciated that slot 86 diverges from the rotor center as the slot is transversed in a counterclockwise direction viewed in FIGURE 6, while slot 85 diverges from the center as the slot is transversed in a clockwise direction viewed in FIGURE 6.

Rotor 21 is further configurated to form two inwardly extending radial arms 92 and 93 disposed on opposite sides of the center of the rotor. These arms are cantilevered and are formed by spaced slots 95, 96, 97 and 98 in the rotor. The innermost end of each of the arms 92 and 93 is of concave configuration as indicated at 100 and 101 so that the free ends of these arms in fact constitute the ends of the slots 85 and 86. It is a characteristic of the rotor material Delrin or Celcon that the material functions as a spring so that when the arms 92 and 93 are shifted away from the opposite ends of their respective slots the arms tend to spring back to their relaxed position shown in FIGURE 6.

The construction of the stator assembly 16 is best shown in FIGURES 4 and 5. As there shown, stator 16 comprises a coil 17 wound about a bobbin 102. Bobbin 102 is formed of a suitable plastic material, such as nylon, and is of generally U-shaped cross section. The stator further comprises two identical stator halves 103 and 104. These stator halves are formed of steel and include a generally annular transverse wall 105 and a plurality of equispaced pole extensions, or tines, 20 bent at right angles to the transverse wall 105 so that the pole extensions lie parallel to the motor axis.

In the specific pole motor shown in FIGURE 5, each stator half 103 and 104 is provided with twenty-five equispaced pole extensions. One stator half is placed at each end of the bobbin 102. The stator halves and bobbin are held in assembled relationship by means of a center sleeve 107 which fits within the center opening of the bobbin and includes overturned ends which clamp the stator halves in place. When the stator is assembled, the pole extensions 20 of stator half 103 and stator half 104 are interleaved. Consequently, the adjacent pole extensions are of opposite instantaneous polarity.

The stator assembly is mounted within motor chamber 15 by means of a shock mount member 109. This member is formed of a suitable resilient material, such as 35 to 40 durometer rubber or vinyl. The shock mount includes a generally cylindrical sleeve portion 119 and a radial flange or foot 120. The shock mount 109 surrounds cylindrical portion 57 of support member 12 with the flange portion 120 in abutment with transverse wall 51. The stator assembly is placed over the shock mount with sleeve 107 of the stator surrounding sleeve portion 119 of the shock mount and stator half 104 in engagement with flange 120. It is to be noted that the stator has no direct contact with motor mounting plate 12 or casing member 13. Thus, the stator is free to oscillate or vibrate through a minute amplitude within the limitations imposed by shock mount 109. When the stator and rotor are assembled, the radial clearance between the pole extensions 20 on the stator and magnet 22 of the rotor is of the order of .020 inch.

Motor chamber 15 also houses a direction control, or reversing mechanism, indicated generally at 111. The function of this mechanism is to insure that rotor 21 is driven in the selected forward direction. Specifically, direction control mechanism 111 comprises pawl 60. This pawl includes an elongated center opening 112 which receives shaft section 58 of the support member 12. The pawl is thus supported for rotational movement around the shaft and for translational movement relative thereto. Pawl member 60 includes a radially extending pawl finger 113. This finger has a radial front face 114 and a sloping rear face 115. Pawl member 60 supports a cylindrical pin 116. This pin extends outwardly from the pawl and is received within one of the slots 85 and 86 of the rotor member 16. The direction of rotor rotation is selected by the choice of the seat into which pin 116 is inserted. As is explained in detail below, when pin 116 is inserted in slot 85, as is shown in FIGURE 1, the rotor is free to move in a counterclockwise direction but is prevented from moving in a clockwise direction. On the other hand, if the pawl pin were inserted in slot 86 the rotor would be constrained to movement in a clockwise direction. (In this event the pawl 60 would have to be overturned so that the radial edge 114 and sloping edge 115 of finger 113 would be reversed.)

The finger 113 of pawl 60 is adapted to engage a stationary ratchet member 117. As is best shown in FIGURES 4 and 5, ratchet member 117 is a cylindrical member press fit or otherwise secured within the confines of sleeve 107. The ratchet member includes a plurality of inwardly extending ratchet teeth 118. Each tooth has a radial abutment edge and a sloping cam edge. As is shown in FIGURE 5, the radial edges are disposed for abutment with the radial front edge 114 of finger 113. It is to be understood that when the rotor is to be driven in the opposite direction, ratchet sleeve 117 is reversed end for end so that the radial edges face in the opposite direction from that shown in FIGURE 5.

The output from the motor is applied to a reduction gear train 27 through center shaft 23 and pinion 26. The function of the reduction gear train is to provide an output shaft speed less than the speed of shaft 23 which is 144 revolutions per minute in the embodiment shown in FIGURE 5. For most timing mechanisms, the desired speed of output shaft 28 is one revolution per minute.

Gear reduction train 27 is mounted within gear housing 14 and includes in addition to pinion 26 a gear member 69 which includes a hub portion rotatably journalled upon shaft 68 molded integral with member 12. Gear member 69 further comprises a large gear 121 which meshes with pinion 26 and a small pinion 122 which drives gear 123 of gear member 124. Gear member 124 includes a hub portion rotatably journalled upon shaft 46 and a pinion 125 in meshing engagement with large gear 126 of gear member 127. In addition gear member 126 includes a hub rotatably journalled upon shaft 45 and a pinion 128 in driving connection with gear 130 mounted upon output shaft 28.

When assembling the present motor, the stator assembly 16 is mounted upon member 12. The rotor member 21 and magnet member 22 are assembled in the manner explained and are subsequently assembled with the stator and support 12. The various gears are mounted upon their respective shafts within gear chamber 14; and housing 11 and support member 12 are snapped together. Cover 13 is also snapped over support member 12 to enclose the motor chamber 15.

One advantage of the present motor construction is that after the stator assembly and rotor have been mounted upon support member 12, the motor can be fully tested. Also, if desired, the assembled motor support, stator and rotor can be stored in this condition with or without the cover member affixed for subsequent assembly with the gear train and gear housing.

In operation, the motor is self-starting. Thus, when an alternating current, for example 110 volts A.C. is applied to leads 18, the rotor 21 will always start to rotate in one direction or another, depending upon the exact position in which the rotor has come to a stop. This self-starting feature of the motor is attributed to two aspects of the motor construction. In the first place, the fifty stator poles are theoretically equispaced from one another so that theoretically the rotor with its fifty equispaced rotor poles could stop in a neutral position in which the rotor and stator poles were disposed in exact alignment. In such a neutral position the rotor would not be self-starting, since there would be no net magnetic force effective to drive the rotor in one direction or the other. In practice, however, it has been found that in the present motor the normal tolerances in the manufacture of the stator cause the stator poles to be somewhat asymmetric, i.e., all fifty poles are not exactly equispaced and are not of exactly equal strength. This asymmetry coupled with the slight oscillation of the stator provided by its resilient mounting are sufficient to cause the motor to self start under all conditions.

The rotor may start to drive in the selected direction, i.e., counterclockwise in FIGURE 1. When the rotor is driven in this direction the rotor engages pin 116 and forces that pin into the end 90 of the slot which is disposed closest to the center of the rotor. Since pin 116 is rigidly attached to pawl 60, pawl 60 not only rotates with the rotor but is also shifted radially inwardly so that finger 113 of the pawl clears ratchet teeth 118 of ratchet sleeve 117. Thus, with the rotor rotating in the selected direction, the direction control mechanism is noiseless and imposes no frictional load on the rotor. If, however, the rotor begins to rotate in the opposite, or "wrong," direction pin 116 is shifted toward the end 91 of slot 85 which is spaced from the center of the rotor, thus pawl member 60 is cammed outwardly to bring tooth 113 into engagement with one of the ratchet teeth 118. This prevents further rotation of the pawl. As the rotor 21 continues to rotate, resilient arm 93 engages the now stationary pin 116 stopping the rotor. This cantilever arm gives slightly which absorbs some shock as the rotor is brought to a stop. Also, the resilient action of the arm 93 tends to start the rotor moving in the opposite direction. Once the rotor starts in this opposite direction it is rapidly brought up to synchronous speed.

A typical motor constructed in accordance with the present drawings is effective to produce 44 inch-ounces of torque while drawing one watt of power. A one quarter watt motor is effective to develop 22 inch-ounces of torque; while a one-eighth watt motor is effective to develop 10 to 12 inch-ounces of torque. The running or synchronous torque of the motor is substantially equal to its starting torque. The efficiency of such motors in terms of the ratio of power output divided by input wattage is of the order of 16 to 32 times that of presently available motors. Because of this high efficiency there is no appreciable heat rise in the motor event after long periods of continuous use.

From the above disclosure of the general principles of the present invention and the above detailed description of a preferred embodiment, those skilled in the art will comprehend various modifications to which the invention is susceptible. For example, while the motor has been shown as including fifty poles it is contemplated that a motor having any desired number of poles can be fabricated. Also, while the motor is shown as having a gear housing of cylindrical configuration, it is contemplated that this housing can be of another configuration such as pear shaped if desired.

Therefore, I desire to be limited only by the scope of the following claims.

Having described my invention, I claim:

1. A small synchronous motor of the type utilized in clocks and the like comprising a stator assembly including an electromagnetic coil and a plurality of field poles disposed along the circumference of a circle, said poles being constituted by a plurality of closely spaced steel tines, a rotor, said rotor including an annular strip of magnetic material having a plurality of permanent magnetic pole portions, the adjacent regions being of opposite magnetic orientation, said magnetic material comprising a plurality of ultrafine anisotropic peramnent magnetic particles of high retentivity disposed in alignment in an elastomeric matrix, said strip of material being disposed for rotative movement concentric with said stator poles, said strip of permanent magnet material surrounding said stator poles in closely spaced relationship therewith.

2. A synchronous motor comprising a stator assembly including an electromagnetic coil and a plurality of field poles substantially equispaced along the circumference of a circle, a cup-shaped rotor including a peripheral wall of circular cross section, a bent strip of magnetic material including a plurality of ultrafine anisotropic permanent magnet particles of high retentivity disposed in alignment in an elastomeric matrix, said strip having a plurality of substantially equispaced magnetized regions, said regions being magnetized to a substantially uniform extent with adjacent regions being of opposite magnetic orientation, said strip being mounted on the interior of said peripheral wall surrounding said field poles.

3. A rotor for a small synchronous motor, said rotor comprising a cup-shaped member including a peripheral wall, an annular magnetic strip composed of an elastomeric binder having dispersed therein aligned ultrafine anisotropic particles of permanent magnet material, said strip having a plurality of substantially equispaced magnetized regions, said regions being magnetized transverse to the width of said strip with adjacent regions being of opposite magnetic orientation, said strip being bent in a circular configuration and being disposed in engagement with the said peripheral wall.

4. A self-starting synchronous motor comprising an annular stator assembly, including a plurality of substantially equispaced stator poles, the spacing of said poles being slightly asymmetric due to manufacturing tolerances, a lightweight rotor including an annular magnetic member surrounding said stator poles, said magnetic member comprising an elastomeric matrix having a plurality of ultrafine aligned and anisotropic permanent magnetic particles dispersed therein, said member having a plurality of equispaced magnetized areas corresponding in number with the number of poles of said stator, the adjacent magnetized areas being of opposite magnetized orientation, and resilient means mounting said stator whereby said stator is free to oscillate to a limited degree.

5. A self-starting synchronous motor comprising an annular stator assembly, including a plurality of stator poles, a lightweight rotor including an annular magnetic member surrounding said stator poles, said magnetic member comprising an elastomeric matrix having a plurality of ultrafine aligned and anisotropic permanent magnetic particles dispersed therein, said member having a plurality of magnetized areas adjacent magnetized areas being of opposite magnetized orientation, and resilient means mounting said stator whereby said stator can oscillate through a small amplitude.

References Cited by the Examiner

UNITED STATES PATENTS

| | | | |
|---|---|---|---|
| 1,915,090 | 6/1933 | Hammond | 310—163 |
| 2,673,939 | 3/1954 | Tetro | 310—41 |
| 2,757,448 | 8/1956 | Brown | 29—453 |
| 2,803,765 | 8/1957 | Timmerman | 310—156 |
| 2,828,942 | 4/1958 | McCullough et al. | 29—453 |
| 2,912,609 | 11/1959 | Kassner | 310—156 |
| 2,985,778 | 5/1961 | Fritz | 310—41 |
| 2,999,275 | 9/1961 | Blume | 18—55 |
| 3,121,131 | 2/1964 | Blume | 264—104 |
| 3,122,666 | 2/1964 | Guiot | 310—41 |

ORIS L. RADER, *Primary Examiner.*

MILTON O. HIRSHFIELD, *Examiner.*